F. A. SCHÄDLER.
SHEET IRON WHEEL.
APPLICATION FILED OCT. 13, 1917.
1,288,217.
Patented Dec. 17, 1918.
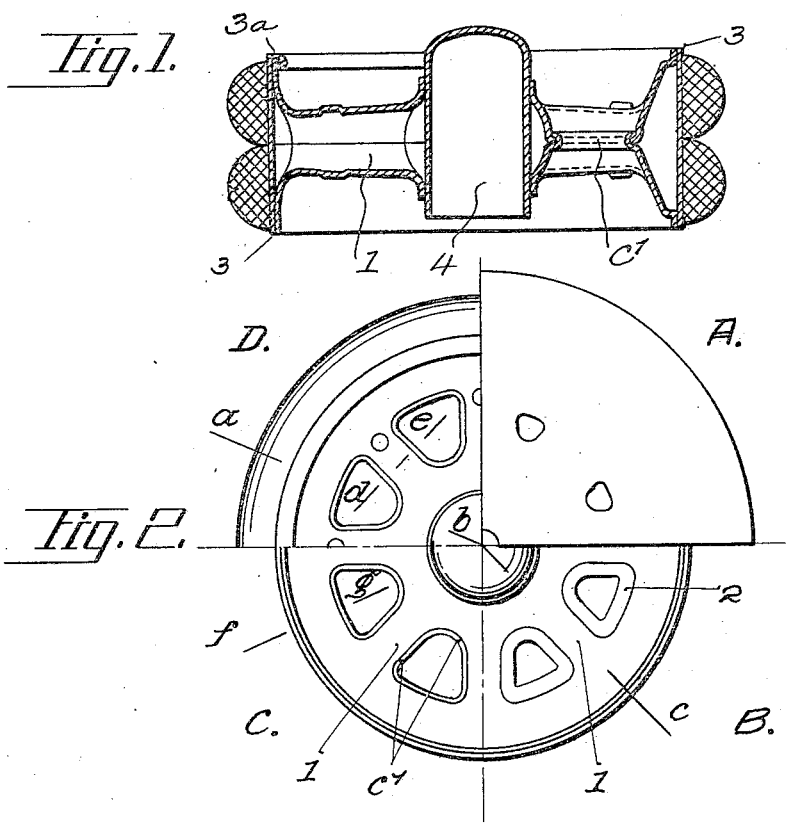
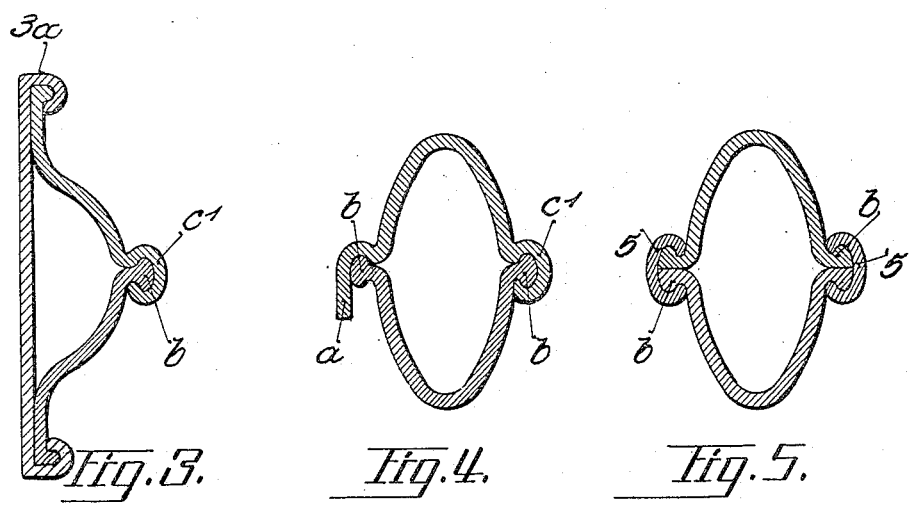
Inventor.
F. August Schädler

UNITED STATES PATENT OFFICE.

FRIEDRICH AUGUST SCHÄDLER, OF ARBON, SWITZERLAND.

SHEET-IRON WHEEL.

1,288,217.  Specification of Letters Patent.  Patented Dec. 17, 1918.

Application filed October 13, 1917. Serial No. 196,501.

*To all whom it may concern:*

Be it known that I, FRIEDRICH AUGUST SCHÄDLER, a citizen of the Republic of Switzerland, residing at Arbon, Thurgau, Switzerland, have invented certain new and useful Improvements in Sheet-Iron Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention is a process for the production of sheet iron wheels for heavy vehicles, especially for motor lorries. The two halves of the wheel are sheet iron disks, and have channel-shaped spokes. The invention refers principally to the joining together of the two pressed wheel halves. For this purpose, specially broad rims are attached to the channel-shaped spokes, which rims are shaped as oval ribs at the back half of the wheel, while at the front half of the wheel they (the rims) are so shaped that they closely connect the two halves of the wheel with one another after the oval rims have been turned over, so that a mutual clutch takes place in all directions, and the two wheel halves are so tightly pressed together, that it is quite impossible for fluids to penetrate.

A sheet iron wheel made in this manner has appreciable advantages; in the first place, the process saves the cleaning and pickling of the iron sheets, which is inevitable with the welding or soldering processes. The omission of the pickling with acid completely does away with the danger of subsequent rust, and therefore a wheel made in this way is very durable. Moreover, this process produces a strong rib, which not only holds the wheel tightly together and protects it against the penetration of fluids, but also in its capacity of stiffening rib, affords the wheel a distinctly greater strength. A further advantage is the simple and cheap manufacture, as this process renders all soldering and welding material superfluous, and merely by pressure tightly joins the two halves of the wheel together with the use of a comparatively simple pressing tool, thus completely doing away with the necessity of any further work, such as calking and polishing up.

Figure 1 of the drawing shows such a wheel in cross section $a$—$b$ and $c$—$b$ of Fig. 2.

Fig. 2 shows at sector A the cut out sheet disk, and at sector B the wheel after the first process. Sector C shows the rims cut, and finally sector D shows the finished wheel.

Fig. 3 of the drawing shows a section $f$—$g$ through the felly's-rim, with the turned over rims $c^1$ and $b$ completely pressed together. 3 shows a design suitable for electric or oxid-acetylene welding, or also for riveting. $3^a$ shows the construction in which the rims of the wheel halves are turned into the encircling band.

Fig. 4 shows a section $d$—$e$ through a spoke, in which the ends of the rims of the one half of the spoke form a thickened oval rib $b$, while opposite rims $c^1$ are turned around $b$, and when completely pressed together with $b$, form with it the rib.

Fig. 5 shows an alternative.

For the production of this wheel, two sheet iron disks are cut in the manner illustrated in sector A of Fig. 2. In this form the sheet iron disks are placed in an annealing furnace, and then in a warm condition are put between the presses. After the first pressing process, they assume the form shown in sector B (Fig. 2), which already possess the channel-shaped spokes 1 with broad rims. The third step in the course of manufacture is the cutting and re-pressing of the rims 2, so that the cross section of the spokes with the rims $a$ and $b$ is as shown in Fig. 4. In the last process, the one half of the wheel is laid on the other, and the rims $a$ and $b$ brought by pressure with the aid of a so-called "rolling tool" into the shape $b$ and $c^1$ shown in Fig. 4.

In the alternative shown in Fig. 5, the rims of the one sheet iron disk do not fold over the rims of the other disk, but the turned up rims $a$ and $b$ are pressed together by means of a separate clamp 5.

I claim—

1. In a sheet metal wheel, two sheet metal parts, one of said parts having its edge enlarged in thickness and the edge of the other part folded around said thickened edge.

2. In a sheet metal wheel, a part having its border portion turned to form a flange and thickened on its edge, and a companion part whose border portion is in swaged connection therewith embracing said thickened edge.

3. In a sheet metal wheel, a part having its border portion turned up, and said turned up portion having a thickened edge, the distance between said edge and the body of said part being substantially the thickness of the metal used, and a companion part having its border portion rolled over said thickened edge, whereby said parts are in interlocking swaged connection.

In testimony that I claim the foregoing as my invention, I have signed my name in presence of two subscribing witnesses.

F. AUGUST SCHÄDLER.

Witnesses:
FRANK M. DIMMKE,
EMIL MEILE.

Copies of this patent may be obtained for five cents each, by addressing the "Commissioner of Patents, Washington, D. C."